(12) United States Patent
Amulothu et al.

(10) Patent No.: US 9,438,478 B1
(45) Date of Patent: Sep. 6, 2016

(54) USING AN SDN CONTROLLER TO AUTOMATICALLY TEST CLOUD PERFORMANCE

(71) Applicant: International Business Machines Corporation, Armonk, NY (US)

(72) Inventors: Venkata Siva N. Amulothu, Plano, TX (US); Kavita Gadde, Cupertino, CA (US); Ashish Kapur, Santa Clara, CA (US); Vishal Shukla, San Jose, CA (US); Saritha Yeddula, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/940,262

(22) Filed: Nov. 13, 2015

(51) Int. Cl.
*H04L 12/28* (2006.01)
*H04L 12/24* (2006.01)
*H04L 12/26* (2006.01)
*H04L 29/08* (2006.01)
*H04L 12/46* (2006.01)

(52) U.S. Cl.
CPC ....... *H04L 41/0896* (2013.01); *H04L 12/4641* (2013.01); *H04L 43/0894* (2013.01); *H04L 43/16* (2013.01); *H04L 67/10* (2013.01); *H04L 67/34* (2013.01)

(58) Field of Classification Search
CPC ... H04L 43/08; H04L 43/50; H04L 43/0876; H04L 43/0847; H04L 43/0864; H04L 43/0882; H04L 43/0888; H04L 43/0894; H04L 41/12; H04L 41/04; H04L 41/0896; H04L 41/5019; H04L 41/5096; H04L 45/56; H04L 45/123; H04L 45/64; H04L 12/4641; H04L 67/10; H04L 67/34

USPC ................... 709/223–224; 370/409
See application file for complete search history.

(56) References Cited

U.S. PATENT DOCUMENTS

| | | | | |
|---|---|---|---|---|
| 2006/0209889 | A1* | 9/2006 | Tamai | H04L 47/10 370/468 |
| 2014/0016467 | A1* | 1/2014 | Bernstein | H04L 45/124 370/235 |
| 2014/0082616 | A1* | 3/2014 | Kurita | G06F 9/455 718/1 |

(Continued)

OTHER PUBLICATIONS

Yu et al., Software Defined Traffic Measurement with OpenSketch, 10th USENIX Symposium on Networked Systems Design and Implementation (NSDI '13) pp. 29-42.

*Primary Examiner* — Alina N Boutah
(74) *Attorney, Agent, or Firm* — Schmeiser, Olsen & Watts, LLP; Matthew Chung

(57) ABSTRACT

A method and associated systems for using a software-defined network (SDN) controller to automatically test cloud performance. A bandwidth measuring and optimizing system associated with the SDN controller detects a triggering condition and, in response, directs a network-management tool to measure a bandwidth of a segment of a physical infrastructure of a network and directs the SDN controller to provision a virtual machine that then measures a bandwidth of a corresponding segment of virtual infrastructure that is overlaid upon the physical segment. In some embodiments, these two tests are synchronized so as to concurrently measure physical and virtual bandwidths while the same test data passes through the virtual infrastructure segment. The measured bandwidth of the virtual segment is then compared to the measured bandwidth of the physical segment in order to determine an efficiency of the virtual network.

16 Claims, 3 Drawing Sheets

(56) References Cited

U.S. PATENT DOCUMENTS

| | | | | |
|---|---|---|---|---|
| 2014/0189074 A1* | 7/2014 | Parker | H04L 63/20 | 709/220 |
| 2014/0199067 A1* | 7/2014 | Ahuja | H04Q 11/0066 | 398/52 |
| 2014/0280547 A1* | 9/2014 | DeCusatis | H04L 67/34 | 709/204 |
| 2014/0281669 A1* | 9/2014 | DeCusatis | G06F 11/2005 | 714/4.11 |
| 2014/0307556 A1* | 10/2014 | Zhang | H04L 45/42 | 370/236 |
| 2014/0337674 A1* | 11/2014 | Ivancic | H04L 43/50 | 714/43 |
| 2015/0124615 A1* | 5/2015 | Spector | H04L 47/22 | 370/235 |
| 2015/0163152 A1* | 6/2015 | Li | H04L 47/2441 | 370/409 |
| 2015/0172115 A1* | 6/2015 | Nguyen | H04L 67/10 | 709/226 |
| 2015/0172208 A1* | 6/2015 | DeCusatis | H04L 47/70 | 709/226 |
| 2015/0188772 A1* | 7/2015 | Gasparakis | H04L 43/08 | 709/224 |
| 2015/0235308 A1* | 8/2015 | Mick | G06Q 30/08 | 705/26.3 |
| 2015/0268981 A1* | 9/2015 | Kaneko | G06F 9/45545 | 718/1 |
| 2015/0281018 A1* | 10/2015 | Britt | G06F 17/30477 | 707/769 |
| 2015/0350102 A1* | 12/2015 | Leon-Garcia | H04L 41/12 | 709/226 |
| 2015/0381428 A1* | 12/2015 | Ong | H04L 41/12 | 709/223 |
| 2015/0381459 A1* | 12/2015 | Xiao | H04L 43/0894 | 370/253 |
| 2015/0381486 A1* | 12/2015 | Xiao | H04L 45/70 | 370/237 |
| 2016/0014007 A1* | 1/2016 | Karame | H04L 43/0864 | 370/252 |

* cited by examiner

USING AN SDN CONTROLLER TO AUTOMATICALLY TEST CLOUD PERFORMANCE

TECHNICAL FIELD

The present invention relates to measuring and improving functioning and performance of a software-defined network by improving functioning and performance of bandwidth-measuring tools used to manage a software-defined network.

BACKGROUND

Components of a virtualized computing platform, such as a cloud-computing environment, may run on software-defined network (SDN) that is overlaid on top of a physical "bare-metal" network. This approach gives network managers great flexibility in configuring virtual network topologies without needing to manipulate an underlying physical infrastructure.

Methods of testing performance of an underlying physical network, such as measuring available network bandwidth by passing data between two physical nodes, have long been known in the art. But using such methods to measure performance of a software-defined network is more difficult. A bare-metal testing mechanism designed to measure network bandwidth between two physical points may not be able to automatically locate, identify, and measure available bandwidth between virtualized end-points of a software-defined network.

Even greater obstacles impede efforts to compare relative performances of a "bare-metal" physical network segment and a software-defined network overlaid on top of the same bare-metal network segment. Bare-metal performance must be measured by a physical-network management console capable of accessing and testing lower levels of a network-protocol stack, such as the physical, media-access control, data link, network, or transport layers. But testing a software-defined network may require a second, distinct, virtualized test tool that has direct access to virtual infrastructure overlaid on top of lower-layer infrastructures. It is therefore difficult to ensure meaningful comparisons between physical and virtual network performances by attempting to synchronize physical and virtual testing mechanisms running on different platforms under the control of different network-management tools.

There is thus no simple, straightforward method of determining whether a software-defined network is making efficient use of its underlying bare-metal network platform. And, even if such a method did exist, it has not been automated so as to provide auto-triggering, real-time or near real-time analysis of an efficiency of a software-defined network as a function of a performance of that SDN's underlying physical infrastructure.

BRIEF SUMMARY

A first embodiment of the present invention provides a bandwidth measuring and optimizing system comprising a processor, a memory coupled to the processor, and a computer-readable hardware storage device coupled to the processor, the storage device containing program code configured to be run by the processor via the memory to implement a method for using an SDN controller to automatically test cloud performance, the method comprising:

the system running a first bandwidth test on a physical path that connects two physical nodes of a physical network, wherein the first bandwidth test measures a first network bandwidth available through the physical network along the physical path;

the system provisioning a virtual machine in a virtualized computing platform running on the physical network; and the system instructing the virtual machine to run a second bandwidth test on a software-defined path that connects two virtual nodes of a software-defined network provisioned on the virtualized computing environment, wherein the second bandwidth test measures a second network bandwidth available through the software-defined network along the software-defined path.

A second embodiment of the present invention provides method for using an SDN controller to automatically test cloud performance, the method for using an SDN controller to automatically test cloud performance, the method comprising:

a processor of a computer system running a first bandwidth test on a physical path that connects two physical nodes of a physical network, wherein the first bandwidth test measures a first network bandwidth available through the physical network along the physical path;

the processor provisioning a virtual machine in a virtualized computing platform running on the physical network; and the processor instructing the virtual machine to run a second bandwidth test on a software-defined path that connects two virtual nodes of a software-defined network provisioned on the virtualized computing environment, wherein the second bandwidth test measures a second network bandwidth available through the software-defined network along the software-defined path.

A third embodiment of the present invention provides a computer program product, comprising a computer-readable hardware storage device having a computer-readable program code stored therein, the program code configured to be executed by a bandwidth measuring and optimizing system comprising a processor, a memory coupled to the processor, and a computer-readable hardware storage device coupled to the processor, the storage device containing program code configured to be run by the processor via the memory to implement a method for using an SDN controller to automatically test cloud performance, the method for using an SDN controller to automatically test cloud performance, the method comprising:

the processor of running a first bandwidth test on a physical path that connects two physical nodes of a physical network, wherein the first bandwidth test measures a first network bandwidth available through the physical network along the physical path;

the processor provisioning a virtual machine in a virtualized computing platform running on the physical network; and the processor instructing the virtual machine to run a second bandwidth test on a software-defined path that connects two virtual nodes of a software-defined network provisioned on the virtualized computing environment, wherein the second bandwidth test measures a second network bandwidth available through the software-defined network along the software-defined path, and wherein the software-defined path is a component of a virtual network that is overlaid on top of the physical infrastructure of the physical path.

DETAILED DESCRIPTION

Figure 1:
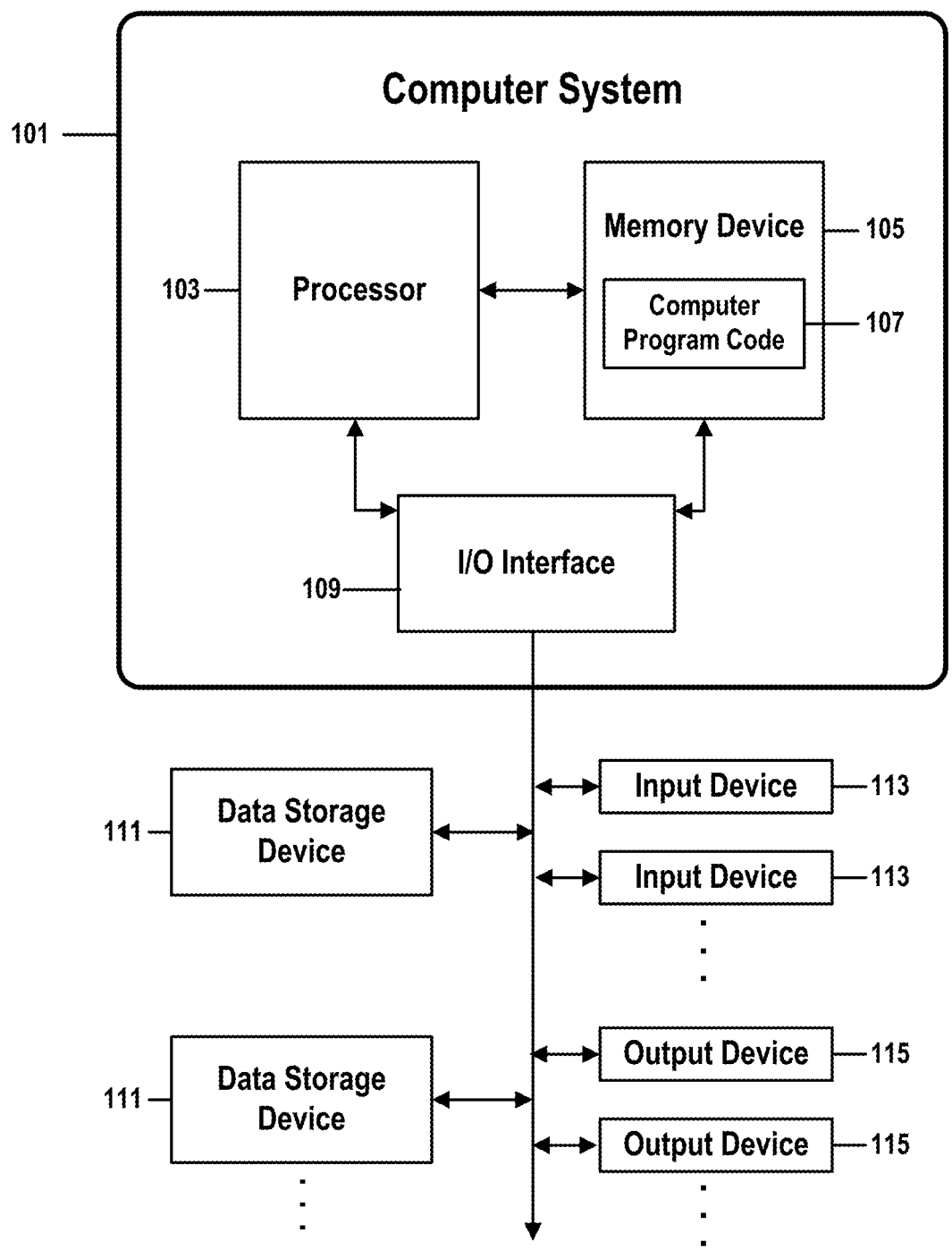
FIG. 1 shows the structure of a computer system and computer program code that may be used to implement a method for using an SDN controller to automatically test cloud performance in accordance with embodiments of the present invention.

Current network test methodologies are cumbersome because they are often limited to merely measuring a rate at which test data may be transferred between two nodes of a physical network infrastructure. Such test methodologies cannot measure network bandwidth through a software-defined or virtual network overlaid on top of the physical network.

The task is rendered even more difficult by the fact that virtual and physical networks generally require different types of tests and, because the two types of network are usually managed by different management consoles, measuring bandwidth of a software-defined network as a function of the available bandwidth of its underlying physical infrastructure generally requires coordinating multiple consoles as they run independent, concurrent tests.

For all these reasons, existing methods of testing network bandwidth are not effective for determining bandwidth available to a software-defined network as a function of total bandwidth resources provided by a physical network that underlays the SDN. A way to determine these figures quickly and automatically would be of great value to a network administrator attempting to determine whether a virtual network is effectively utilizing all network resources available to it at the physical network layer.

Embodiments of the present invention teach a method of using a single software-defined network (SDN) controller (which is a network-management component commonly used to manage virtual infrastructure, cloud networks, and other types of software-defined networks) to automatically measure and compare bandwidths of physical and virtual networks deployed on a same component of network infrastructure. In some embodiments, this method may be configured to self-start upon the occurrence of a predetermined condition, enabling it to be incorporated into an existing network-management system as an automated diagnostic and corrective tool.

In one exemplary embodiment, if an SDN controller, possibly implemented as a module of a network-management platform of a cloud-computing environment, detects that available network bandwidth across a segment of physical or virtual infrastructure has become critically low, that SDN controller may in response automatically measure bandwidths of both the physical and the virtual network infrastructure of the segment in question, and then display results of those tests when notifying a network administrator of the critical bandwidth condition. These results may, for example, reveal that available bandwidth through the virtual segment is a small fraction of the physical network's capacity, thereby allowing the administrator to infer that a network bottleneck is more likely to exist in the virtual layer than in the physical layer.

Embodiments and examples of the present invention described in this document may similarly improve an operation of a software-defined network or of an SDS controller in any other type of networked environment that comprises software-defined or other types of virtualized network infrastructure. By allowing such testing and analysis to be performed by a small module of a single network-management component that is almost certain to already be deployed, embodiments provide a simple solution that may be implemented without requiring a significant programming effort or an addition of specialized hardware.

Embodiments provide further benefits and improvements to the function of a virtualized network and network-management mechanisms by teaching a simple method of using a single module to test both virtual and physical infrastructure, and by performing these tasks quickly enough to allow the resulting virtual and physical bandwidth measurements to be treated as though they represent concurrent measurements.

This performance constraint allows embodiments to compute derived benchmarks, such as a network-path efficiency measurement that represents available bandwidth of a virtual network segment as a percent of the bandwidth available, at approximately the same time, through a physical network segment upon which the virtual segment has been provisioned. Other parameters, as required by implementation-dependent factors, may be derived, such as a continuous near real-time identification of overall performance of one or more software-defined network topologies comprised by a cloud-computing environment.

FIG. 1 shows a structure of a computer system and computer program code that may be used to implement a method for using an SDN controller to automatically test cloud performance in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for using an SDN controller to automatically test cloud performance in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for using an SDN controller to automatically test cloud performance.

Any of the components of the present invention could be created, integrated, hosted, maintained, deployed, managed, serviced, supported, etc. by a service provider who offers to facilitate a method for using an SDN controller to automatically test cloud performance. Thus the present invention discloses a process for deploying or integrating computing infrastructure, comprising integrating computer-readable code into the computer system 101, wherein the code in combination with the computer system 101 is capable of performing a method for using an SDN controller to automatically test cloud performance.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for using an SDN controller to automatically test cloud performance may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for using an SDN controller to automatically test cloud performance is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
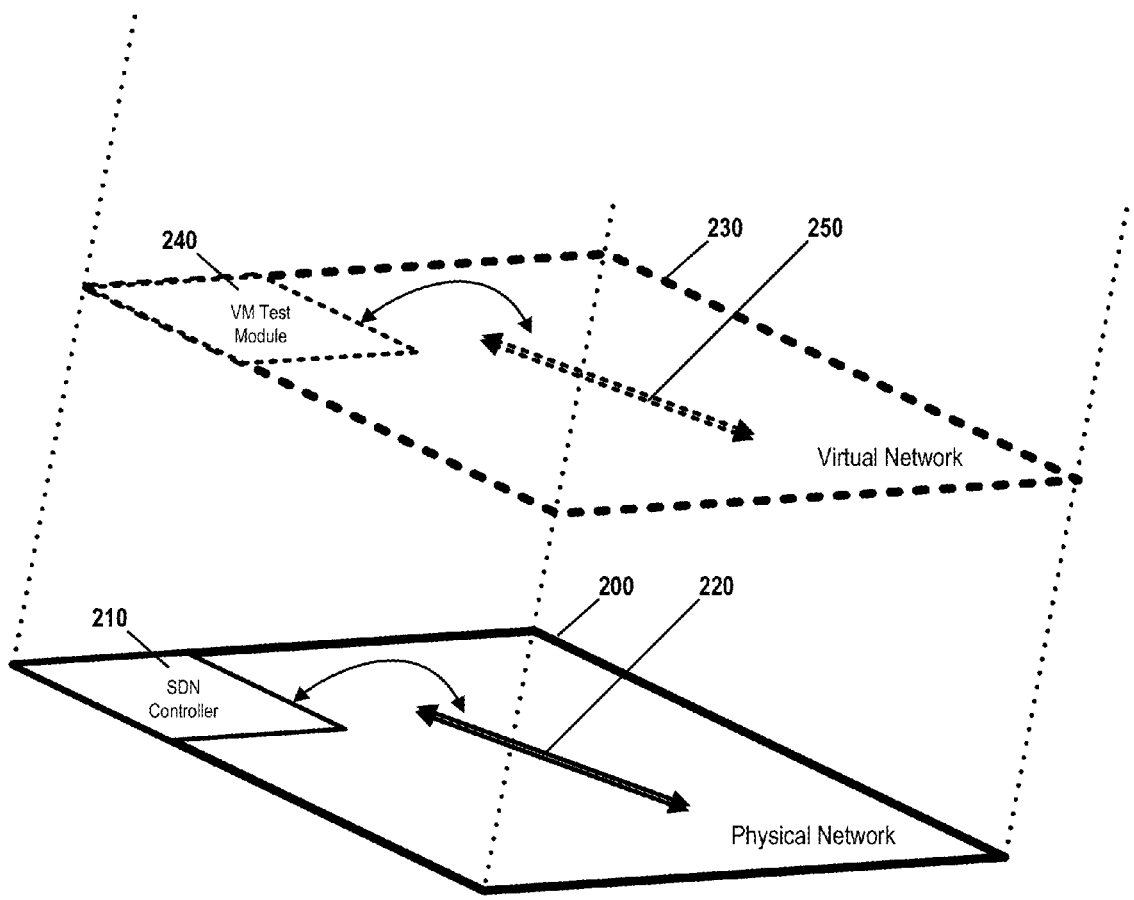
FIG. 2 shows relationships among network components upon which an embodiment of the method of the present invention may be deployed.

FIG. 2 shows relationships among network components upon which an embodiment of the method of the present invention may be deployed. FIG. 2 shows elements identified by reference numbers 200-250.

FIG. 2 shows two layers of a virtualized computer network, such as one upon which might be deployed a cloud-computing environment.

At the bottom of a stack of network layers is a physical network layer 200, which comprises physical infrastructure, such as network interface cards, routers, switches, cabling, and servers. A physical network is implemented on this physical layer 200 by means known in the art, and the network infrastructure at this layer is managed by administrators through one or more physical-network network management consoles or similar management means known in the art.

This physical network may be organized into a large number of infrastructure components, such as physical network segments that may each comprise a combination of cabling, interfaces, connectors, computer systems, hardware interfaces, networking software, and other components, that connect physical network nodes, or end-points.

FIG. 2 shows one such segment 220, which connects two physical nodes that may comprise servers, user workstations, user mobile devices, peripheral devices, interfaces to other networks, or any other combination of compatible network entities known in the art.

A software-defined network (SDN) controller 210 may be deployed as a component of the physical network 200. In some implementations, an SDN controller 210 may be incorporated into a network-management console, but in other cases, it could be implemented as a standalone hardware or software module o a cloud-management console or other entity capable of creating, provisioning, deploying, and managing software-defined infrastructure.

Embodiments of the present invention may be implemented as a component of SDN controller 210, or maybe configured as one or more distinct modules that complement or interact with SDN controller 210. In all cases, a method of the present invention is performed by one or more processors that may be comprised by a physical network-management console, tool or system, by an SDN controller, or by a distinct module residing at the physical layer of physical network 200.

Virtual network 230 is provisioned from resources of the physical network 200. A virtual network 230 may, for example, comprise virtual components like computers, network interfaces, storage devices, or routers. These virtual components may be configured, provisioned, managed, and monitored by the SDN controller 210 or by other managing means known in the art, such as a cloud-management facility or a virtualization means that overlays a virtual network layer on top of a physical layer 200, from which virtual networks and infrastructure components may be created. In all embodiments, regardless of intervening layers or other resource-management means, the present invention may be implemented so as to be performed by one or more processors capable of initiating, or directing another entity to initiate, a bandwidth test of a component of the physical infrastructure of physical network 200, and further capable of provisioning, or of directing another entity to provision, from virtual network 230 a virtual test mechanism 240 capable of measuring bandwidth of a component of virtual network 230.

Embodiments of the present invention disclosed in this document describe such testing as being performed by the SDN controller 210 (or by an other entity with similar functionality) on physical network segment 220, which connects a pair of physical nodes; and as being further performed by the virtual-machine test module 240 (or by an other entity with similar functionality) on a virtual network segment 250 that connects a pair of virtual nodes.

In certain embodiments, virtual network segment 250 is provisioned from the same physical network resources that are measured by SDN controller 210. In certain embodiments, virtual network segment 250 connects a pair of virtual network nodes that are provisioned from the same physical network resources that comprise the physical nodes connected by physical network segment 220.

In examples, and in some embodiments, described in this document, virtual segment 250 and its virtual endpoints are chosen so as to exactly match the physical endpoints and path of physical segment 220. In certain embodiments, ensuring a close match between the tested virtual and physical infrastructures helps ensure that the measured virtual and physical bandwidths identify performance characteristics of two entities that are similar enough to facilitate a meaningful comparison.

In real-world embodiments, other network layers may exist between the layers within which physical network 200 and virtual network 230 exist. Furthermore, physical network 200 and virtual network 230 may each comprise components that span multiple network layers. The TCP/IP and OSI models, for example, identify network-protocol stacks that do not map onto the physical 200 and virtual 230 networks shown here. FIG. 2 is not intended to illustrate a typical real-world network stack, but rather to show a logical relationship between an underlying physical network infrastructure and a software-defined network that is overlaid upon the physical network and that is provisioned from resources of the physical network.

In other words, embodiments of the present invention endeavor to compare virtual bandwidth resources and physical bandwidth resources made available by a same set of physical network resources. In this way, such embodiments may determine how efficiently the physical network resources are utilized by a corresponding virtual infrastructure.

Figure 3:
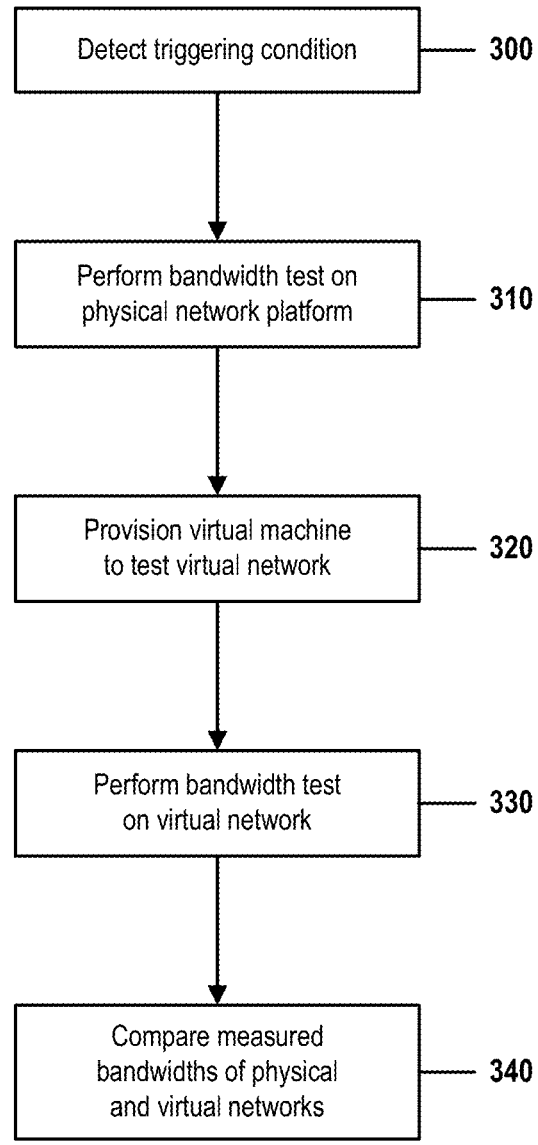
FIG. 3 is a flow chart that illustrates a method for using an SDN controller to automatically test cloud performance in accordance with embodiments of the present invention.

FIG. 3 is a flow chart that illustrates a method for using an SDN controller to automatically test cloud performance in accordance with embodiments of the present invention. FIG. 3 comprises steps 300-340 and is performed by components described in FIGS. 1 and 2 within an operating environment described in FIG. 2.

In step 300, one or more processors detect a triggering condition that initiates a performance of the method of FIG. 3. As described in FIG. 2, these processors may be comprised by a software-defined network (SDN) controller 210, may be part of a network-management console or other module designed to perform functions complementary to that of SDN controller 210, or may be part of an other networked entity associated with physical network 200.

The triggering condition may be any predetermined condition or state that, as a function of implementation-dependent factors, identifies a requirement for the method of FIG. 3 to be performed. A triggering condition might, for example, be a detection that a bandwidth of a mission-critical segment, backbone, local-area network, or other component of software-defined network 230 has fallen below a threshold value. Other possible triggering conditions might be a detection of a significant loss of bandwidth on a segment of physical or virtual infrastructure, or a determination that a network-dependent application's performance or response time has deteriorated beyond a threshold value.

In some implementations, a performance of the method of FIG. 3 may be triggered manually, by a system administrator, expert user, expert system, maintenance specialist, or other human or computerized agent. If, for example, a privileged user experiences unacceptable response times from a mission-critical application, that user may be allowed to manually initiate a bandwidth-testing procedure that produces results that may be automatically reported to a network-administrator or logged by a network-management console.

In some cases, a triggering condition may be determined as a function of a time at which bandwidth tests have been previously scheduled, or as a duration of time since the last performance of the bandwidth tests.

In some embodiments, the triggering condition may identify a physical subset of physical network 200, such as a physical network segment 220 that connects a pair of physical network nodes. In other embodiments, the triggering condition may identify other information from which may be inferred an identification of segment 220. In a general case, the identification may identify a component of physical network infrastructure that is more or less complex than a network segment, such as a site backbone, a local-area network, or a component of a wide-area network.

In some embodiments, the triggering condition may further identify a subset of virtual network 230, such as a virtual network segment 250 that connects a pair of virtual network nodes. In other embodiments, the triggering condition may identify other information from which may be inferred an identification of segment 250. In a general case, the identification may identify a component of virtual or software-defined network infrastructure that is more or less complex than a virtualized network segment, such as a virtual LAN or a more complex virtual network topology.

In step 310, the one or more processors perform a bandwidth test on physical network segment 220 that identifies how much bandwidth is available across that segment 220, between the pair of physical network nodes that are connected by segment 220.

This bandwidth test may be performed by any means known in the art, using any type of convention or known test module, procedure or technology. In one example, the processors may install or launch a TCP-based test module provided by a vendor of a network-management console used to manage physical network 200.

This bandwidth test will report an amount of network bandwidth available on physical network segment 220 that may be used to allocate bandwidth resources to virtual network segment 250. If, for example, the network stack implements a TCP/IP protocol, the bandwidth test might be implemented as an application-level operation that measures TCP traffic at a Transport or Network layer lying between physical layer 200 and virtual layer 230.

In an idealized implementation, this testing would reveal that virtual segment 250 has bandwidth equal to that available to the physical segment 220, less any bandwidth consumed by system, network, or platform overhead.

In step 320, the one or more processors, by means of SDN controller 210 or other virtualization component known in the art, configures, provisions, and deploys a virtual machine 240 on the virtual network that is configured to perform a bandwidth test on virtual network segment 250.

In step 330, the one or more processors directs the virtual test device 240 to perform, by means known in the art, a bandwidth test on virtual network segment 250 that identifies how much bandwidth is available across that segment 250, between the pair of virtual network nodes that are connected by segment 250.

In certain embodiments, the one or more processors endeavor to perform steps 310 through 330 during as brief a period of time as possible, so that the virtual and physical bandwidth measurements most closely approximate measurements taken at the same time. This consideration is important to embodiments in which the two measurements are compared in order to determine a behavior of one measurement as a function of the other. If, for example, a goal of an embodiment is to determine how much physical bandwidth is lost during its translation to a virtual resource, it is important to know how much physical bandwidth is actually available to a virtual network at the time that the virtual network's bandwidth is measured.

In some embodiments, the physical bandwidth test of step 310 and the virtual bandwidth test of step 330 may be synchronized by means of communications between the modules running the two tests. If, for example, an SDN controller 210 running a physical test and a test-module virtual machine 240 running the virtual test both communicate with a common synchronization module, such as a database, logging mechanism, system clock, scheduling mechanism, or other synchronization tool known in the art, the one or more processors may initiate both tests at exactly the same time. This procedure may in some embodiments also allow the two measurements to be performed while the same set of test data is passed through the virtual segment 250 and through the corresponding physical segment 220.

In some real-world implementations, it may not be possible to measure both physical and virtual bandwidths at precisely the same time. However, properly designed bandwidth tests, as is known in the art, may produce time-averaged bandwidth measurements that identify an average bandwidth over a period of time. In such cases, there may be no need to measure instantaneous values of both physical and virtual segments at precisely the same time. If, for example, the test of step 310 identifies a stable, average amount of physical bandwidth available to the virtual segment 250 over 20-second span of time, there may be a reasonable likelihood that that measured physical bandwidth resource may continue to be available to virtual segment 250 during a bandwidth test of step 330 that is launched immediately after concluding the physical test of step 310.

Embodiments of the present invention may comprise different degrees of tolerance for such time constraints, as a function of implementation-dependent considerations.

In step 340, the one or more processors may use the physical-bandwidth results of the test of step 310 and the virtual-bandwidth results of the test of step 330 to derive one or more parameters or benchmarks that may be of use to a network-administrator, maintenance specialist, user, network-logging or maintenance mechanism, expert system, or other interested human or computerized agent.

In one example, these test results may be used to compute a value of a network-path efficiency parameter that identifies how efficiently a path of virtual infrastructure utilizes the physical network resources allocated to it.

In one example, the physical network-bandwidth test of step 310 may reveal that physical network segment 220 is capable of transferring data between the physical network nodes connected by the segment 220 at a rate of 150 Mbps. The virtual network-bandwidth test of step 330 may further reveal that virtual network segment 250 is capable of transferring data between the virtual network nodes connected by the segment 250 at a rate of 75 Mbps.

In this example, the processors might derive a network efficiency of the physical network path 220 and its analogous virtual network path 250 as a ratio between the two measured bandwidths or as a percent value obtained by dividing the measured virtual bandwidth by the measured physical bandwidth. Using such a methodology, a network-path efficiency would be computed as 50%=150 Mbps/75 Mbps.

Other relevant network benchmarks may be determined from the results of the tests of steps 310 and 330, or by inferring patterns or trends indicated by a sequence of such results sampled over a period of time.

What is claimed is:

1. A bandwidth measuring and optimizing system comprising a processor, a memory coupled to the processor, and a computer-readable hardware storage device coupled to the processor, the storage device containing program code configured to be run by the processor via the memory to implement a method for using an SDN controller to automatically test cloud performance, the method comprising:
the system running a first bandwidth test on a physical path that connects two physical nodes of a physical network, wherein the first bandwidth test measures a first network bandwidth available through the physical network along the physical path;
the system provisioning a virtual machine in a virtualized computing platform running on the physical network;
the system instructing the virtual machine to run a second bandwidth test on a software-defined path that connects two virtual nodes of a software-defined network provisioned on the virtualized computing environment, wherein the second bandwidth test measures a second network bandwidth available through the software-defined network along the software-defined path; and
the processor determining a network-path efficiency between the two physical nodes by comparing the first network bandwidth to the second network bandwidth, wherein the network-path efficiency is determined by dividing the second network bandwidth by the first network bandwidth.

2. The system of claim 1, wherein the software-defined path is a component of a virtual network that is overlaid on top of the physical infrastructure of the physical path.

3. The system of claim 2, wherein the second network bandwidth identifies bandwidth available over virtual infrastructure provisioned on physical infrastructure through which is available the first network bandwidth.

4. The method of claim 1, further comprising:
the system detecting a trigger condition; and
the system performing the running, provisioning, and initiating in response to the detecting.

5. The method of claim 4, wherein the trigger condition is selected from a group comprising: a detection that a virtual network bandwidth falls above or below a threshold value, a detection that a physical network bandwidth falls above or below a threshold value, a receipt of a test request from an extrinsic hardware or software module, an occurrence of a particular time, a determination that a certain duration of time has elapsed since the most recent performance of the first and second bandwidth tests, and a receipt of a test request from a user.

6. The system of claim 1, wherein the first bandwidth test and the second bandwidth test are performed closely enough in time to produce measurements that may be considered concurrent.

7. The system of claim 1, wherein the system uses a synchronization mechanism to initiate the first bandwidth test at a same time that the virtual machine initiates the second bandwidth test.

8. The system of claim 1, wherein the first bandwidth test measures a throughput of network traffic passing through the physical path while the virtual machine is performing the second bandwidth test.

9. A method for using an SDN controller to automatically test cloud performance, the method for using an SDN controller to automatically test cloud performance, the method comprising:
a processor of a computer system running a first bandwidth test on a physical path that connects two physical nodes of a physical network, wherein the first bandwidth test measures a first network bandwidth available through the physical network along the physical path;
the system provisioning a virtual machine in a virtualized computing platform running on the physical network;
the system instructing the virtual machine to run a second bandwidth test on a software-defined path that connects two virtual nodes of a software-defined network provisioned on the virtualized computing environment, wherein the second bandwidth test measures a second network bandwidth available through the software-defined network along the software-defined path; and
the processor determining a network-path efficiency between the two physical nodes by comparing the first network bandwidth to the second network bandwidth, wherein the network-path efficiency is determined by dividing the second network bandwidth by the first network bandwidth.

10. The method of claim 9, wherein the software-defined path is a component of a virtual network that is overlaid on top of the physical infrastructure of the physical path.

11. The method of claim 9, further comprising:
the system detecting a trigger condition; and
the system performing the running, provisioning, and initiating in response to the detecting.

12. The method of claim 9, wherein the first bandwidth test and the second bandwidth test are performed closely enough in time such that the first bandwidth test measures a throughput of network traffic passing through the physical path while the virtual machine is performing the second bandwidth test.

13. The method of claim 9, further comprising providing at least one support service for at least one of creating, integrating, hosting, maintaining, and deploying computer-readable program code in the computer system, wherein the computer-readable program code in combination with the computer system is configured to implement the running, provisioning, and instructing.

14. A computer program product, comprising a computer-readable hardware storage device having a computer-readable program code stored therein, the program code configured to be executed by a bandwidth measuring and optimizing system comprising a processor, a memory coupled to the processor, and a computer-readable hardware storage device coupled to the processor, the storage device containing program code configured to be run by the processor via the memory to implement a method for using an SDN controller to automatically test cloud performance, the method for using an SDN controller to automatically test cloud performance, the method comprising:
the processor of running a first bandwidth test on a physical path that connects two physical nodes of a physical network, wherein the first bandwidth test measures a first network bandwidth available through the physical network along the physical path;
the system provisioning a virtual machine in a virtualized computing platform running on the physical network;
the system instructing the virtual machine to run a second bandwidth test on a software-defined path that connects two virtual nodes of a software-defined network provisioned on the virtualized computing environment, wherein the second bandwidth test measures a second network bandwidth available through the software-defined network along the software-defined path; and
the processor determining a network-path efficiency between the two physical nodes by comparing the first network bandwidth to the second network bandwidth, wherein the network-path efficiency is determined by dividing the second network bandwidth by the first network bandwidth.

15. The computer program product of claim 14, further comprising:
- the system detecting a trigger condition; and
- the system performing the running, provisioning, and initiating in response to the detecting.

16. The computer program product of claim 14, wherein the first bandwidth test and the second bandwidth test are performed closely enough in time such that the first bandwidth test measures a throughput of network traffic passing through the physical path while the virtual machine is performing the second bandwidth test.

* * * * *